Figure 1:
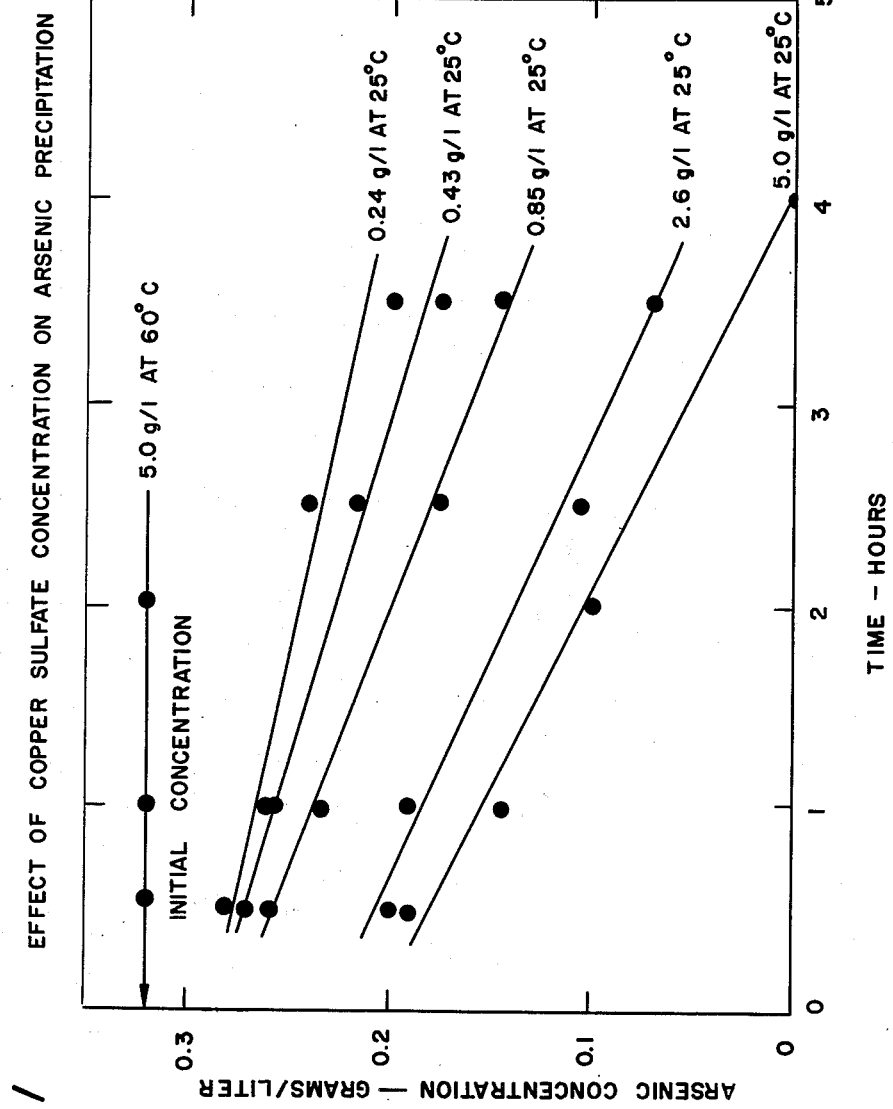

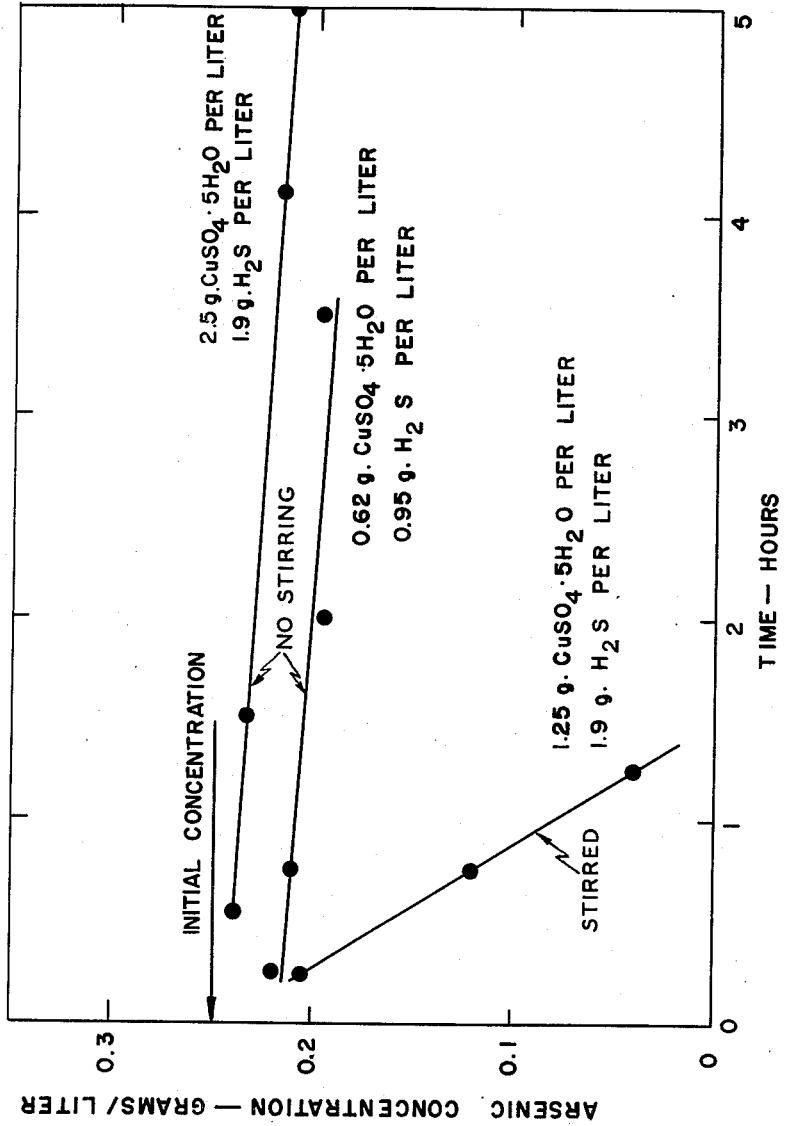

3,216,787
SELECTIVE ARSENIC IMPURITY REMOVAL FROM AQUEOUS VANADIUM BEARING LIQUORS
William Koenen, Pompton Plains, N.J., and Robert E. Dutton, Monroe, N.Y., assignors to Union Carbide Corporation, a corporation of New York
Filed Aug. 15, 1962, Ser. No. 217,173
10 Claims. (Cl. 23—22)

The present invention relates to a process for selective removal of arsenic impurities from aqueous vanadium bearing liquors.

At present there is no known commercial method for selectively removing arsenic contaminants from acidic vanadium bearing solutions without coprecipitation of the arsenic with all of the other impurities in the solution.

In general acidic vanadium bearing aqueous stripping solutions contain iron, aluminum, phosphorous and arsenic as impurities. It has been the general practice in the art to first precipitate most of these impurities from the stripping solution while maintaining the vanadium in solution and then, after filtration of the precipitated impurities from the purified stripping solution, precipitating the vanadium from solution. This is a time consuming and expensive process. The stripping solutions coming from the solvent extraction circuits are highly acidic and must be neutralized to precipitate the impurities. The iron, aluminum, arsenic and other impurities form flocculent hydrated precipitates which carry down a substantial amount of vanadium values thereby leading to lower vanadium recovery. Filtration of the heavy precipitates is also expensive and difficult.

It would be most desirable to selectively precipitate highly pure vanadium directly from the stripping solution without going through the aforementioned preliminary impurity precipitation step. U.S. patent application Serial No. 217,194 filed August 15, 1962 by Kelmers et al. discloses and claims a process for producing highly pure vanadium pentoxide from iron, phosphorous and aluminum contaminated acidic stripping solutions. It has been found that arsenic will precipitate to some extent with vanadium in the aforementioned direct precipitation process. Since typical specifications for vanadium pentoxide, the product form in which the vanadium values are sold, require less than 0.03 weight percent arsenic, it is readily apparent that to consistently achieve specification grade vanadium pentoxide by the aforementioned direct process it is necessary to employ a selective arsenic removal step. This step should not entail mass impurity precipitation with the attendant vanadium loss and filtration problems.

It is an object of the present invention to provide a process for selectively precipitating arsenic impurities from an acidic arsenic contaminated aqueous vanadium bearing solution. It is a further object to provide a process for selectively removing arsenic from arsenic, iron, aluminum and phosphorus contaminated acidic aqueous vanadium bearing stripping solutions.

The aforementioned objects are met by a process comprising adding to an aqueous solution having a pH of about 0.0 ±0.1 and containing solubilized vanadium values, arsenic contaminants and copper ions, a source of soluble sulfide ion and holding the temperature of said solution at less than about 60° C. to cause selective removal of arsenic from the solution by precipitation as a sulfide without coprecipitation of iron, aluminum and phosphorous contaminants and vanadium values.

More particularly an embodiment of the present process relates to selectively removing arsenic impurities from arsenic, iron, aluminum and phosphorous contaminated aqueous vanadium containing stripping solution, maintaining the pH at 0.0 ±0.1, adding to such an aqueous stripping solution sufficient copper sulphate to bring its concentration to at least about 5.0 grams per liter, and adding sufficient ion to the solution to theoretically convert the arsenic contaminants to $As_2S_3$ and to cause concurrent precipitation of copper as a sulfide; digesting the solution at a temperature less than about 60° C. and removing the arsenic which precipitates from the solution.

The highly acidic starting solutions of the present invention are conveniently those resulting directly from the stripping circuits in a solvent extraction operation. The pH of such solutions in vanadium beneficiation is generally about 0.0. They are very highly acidic and consequently can be treated directly by the process of the present invention. It is essential that the pH of the solution be maintained at about 0.0 ±0.1 during precipitation of arsenic to achieve selectivity. If the pH is permitted to rise to as much as about one pH unit, vanadium, and iron as well as other materials will precipitate in substantial quantities.

But while it is essential to maintain the pH of the solution about 0.0 to achieve selective precipitation of arsenic as a sulfide, that is as $As_2S_3$, it has also been found that arsenic sulfide at this pH exists as a stable colloid. To solve this problem it has been found that the presence of copper ions in the solution tends to prevent colloid formation and cause the $As_2S_3$ to freely precipitate in a filterable form. In addition it has been found that the copper also precipitates as a sulfide with the arsenic precipitation thereby preventing copper contamination of the arsenic free stripping solution. The exact mechanism of the arsenic-copper-sulfide precipitation is not known and it may be that the mineral enargite may be formed. At any rate it has been demonstrated that the use of copper ions in conjunction with the sulfide ions in the vanadium bearing solution readily causes selective precipitation of arsenic sulfide in a readily filterable form without causing copper contamination of the vanadium bearing solution. The copper-arsenic-sulfide precipitate does not drag down other impurities nor does it take down or cause the loss of vanadium values.

Although, generally, in practice a source of copper ions will have to be added to the solution prior to the addition of the source of sulfide ion, in some instances there may be some copper ion in the stripping solution as a contaminant. In the later instance less copper ion need by added and in some instances it may not be necessary to add copper ion at all.

The relative amounts of copper ions as well as sulfide ions necessary to virtually completely and selectively purge the strip solutions of arsenic impurities as well as the required digestion time are interrelated and it is difficult to set actual limits on these parameters unless reference is made to the optimum conditions under which it is desirable to operate. Once these are known, it will be apparent from the following disclosure which relative limits must be imposed on the aforementioned parameters.

The following data illustrate the necessity of employing an arsenic removal step prior to conducting a direct vanadium precipitation process such as is disclosed in the aforementioned patent application in order to consistently achieve a product containing less than about 0.03 weight percent arsenic. Thirty-five samples of a vanadium stripping solution having a pH of about 0.0 ±0.1 and analyzing 74.36 grams per liter of $V_2O_5$, 0.97 weight percent Fe, 2.92 weight percent aluminum, 0.20 weight percent arsenic and 0.87 weight percent $PO_4$ were treated by the direct vanadium precipitation process disclosed in the aforementioned patent application. The arsenic content of each of the products is grouped in the following Table I.

Table I

| Arsenic content (wt. percent): | Number of samples |
|---|---|
| 0.05–0.06 | 1 |
| 0.07–0.08 | 2 |
| 0.09–0.10 | 3 |
| 0.11–0.12 | 4 |
| 0.13–0.14 | 10 |
| 0.15–0.16 | 4 |
| 0.17–0.18 | 5 |
| 0.19–0.20 | 3 |
| 0.21–0.22 | 1 |

In sharp contrast, eleven direct vanadium precipitation tests conducted in accordance with the process described in the aforementioned patent application but preceded by the arsenic removal step of the present invention resulted in products all of which contained less than 0.005 weight percent arsenic.

It is clear that specification grade vanadium pentoxide cannot be prepared consistently without some prior arsenic removal step. Also as mentioned above, the arsenic removal step should not cause mass precipitation of other impurities or vanadium but rather should be selective in regard to arsenic contaminants.

The temperature of the starting solution must be kept below about 60° C. to achieve any precipitation of arsenic at all. This effect is clearly shown in FIG. I. FIG. I is a graphical presentation of the arsenic concentration in the stripping solution as a function of time for various copper sulfate concentrations when the solution was saturated with $H_2S$ as the source of sulfide ion. The data for preparation of FIG. I was secured by treating a starting stripping solution having a pH of 0.0 ±0.1 and analyzing 70.06 grams per liter of $V_2O_5$, 1.10 weight percent iron, 4.45 weight percent aluminum, and 0.32 weight percent arsenic first with the arsenic removal step of the present process under the conditions noted in FIG. I followed by the single precipitation process as disclosed in the above-identified patent application. The arsenic concentration listed in FIG. I is that concentration of arsenic in the final $V_2O_5$ product. It is readily apparent from FIG. I that for a given solution saturated with $H_2S$ about 5.0 grams per liter of hydrated copper sulfate ($CuSO_4 \cdot 5H_2O$) will cause complete selective precipitation of the arsenic impurity within 4 hours of digestion time. While smaller concentrations of copper ions will result in eventual selective removal of arsenic from the solution, FIG. I does indicate that considerably more time is required to achieve complete removal at lower copper ion concentrations.

In general it can be said that sufficient sulfide ion should be available in the solution to theoretically convert all the arsenic to $As_2S_3$ and to precipitate a portion of the copper ions in solution as copper sulfide. The exact amount of copper sulfide which must be concurrently precipitated with the arsenic sulfide to prevent the formation of a stable colloid of the latter cannot be specified with exactness. It can be said that most of the copper and indeed virtually all of the copper put into the solution will be precipitated. In many instances there will be contaminants such as ferric ions which will consume the sulfide ion by reducing the ferric ion to the ferrous state. In this instance, of course, additional sulfide ion is required to achieve the requisite conversion of arsenic to a filterable arsenic sulfide precipitate. In addition to $H_2S$, NaSH as well as other soluble sulfides may be used as a source of sulfide ion in the stripping solution. It has been found that NaSH is an extremely efficient source of sulfide ion and indeed in some instances greatly reduces the digestion time required for complete selective precipitaiton of arsenic.

In addition to the foregoing consideration, it has surprisingly been found that agitation greatly increases the rate of selective precipitation and indeed permits an artisan to conduct the present selective precipitation process at much lower copper and sulfide ion concentrations. It would be noted that it is indeed surprising and somewhat contrary to normal observations to find that agitation in a system tending to form a colloidal suspension is beneficial.

FIG. II graphically illustrates the effect of agitation on the time required to selectively purge the stripping solution of arsenic contaminants. The data for preparation of FIG. II was secured by treating a stripping solution having a pH of 0.0 ±0.1 and analyzing 74.70 grams per liter of $V_2O_5$, 1.04 weight percent Fe, 1.99 weight percent aluminum, 0.38 weight percent $PO_4$ and 0.25 weight percent arsenic first in accordance with the herein disclosed selective arsenic precipitation and thereafter in accordance with the single precipitation process for recovery of pure vanadium as disclosed in the above-mentioned patent application. The arsenic concentration is that occurring in the final $V_2O_5$ product.

FIG. II clearly and concisely shows the manifold decrease in time required to selectively remove arsenic from the stripping solution when agitation is employed. This fact is illustrated in FIG. II in spite of the fact that twice the amount of hydrated copper sulphate, as was used in the agitated solution, was used in the unagitated solution.

While the subject invention has been described above with some degree of particularity, it is contemplated that minor modifications may be made in the present invention without departing from the spirit and scope thereof.

What is claimed is:

1. A process for substantially completely removing arsenic from aqueous solutions containing vanadium values and contaminated with arsenic, iron, aluminum, copper and phosphorus, without causing co-precipitation of the vanadium, iron, aluminum and phosphorus, comprising:
   (1) maintaining the temperature of said solution below 60° C.,
   (2) maintaining the pH of said solution at about 0.0 +0.1,
   (3) adding to said solution sufficient sulfide ions to cause substantially complete precipitation of the arsenic as $As_2S_3$ and substantial precipitation of the copper as copper sulfide,
   (4) digesting said solution at a temperature of from below 60° C. to about 25° C., and
   (5) separating the precipitated copper and arsenic compounds from the vanadium containing solution.

2. The process of claim 1 wherein the sulfide ions are provided by the addition of $H_2S$.

3. The process of claim 1 wherein the sulfide ions are provided by the addition of NaSH.

4. The process of claim 1 wherein the solution is agitated during digestion.

5. A process for substantially completely removing arsenic from aqueous solutions containing vanadium values and contaminated with arsenic, iron, aluminum, and phosphorus, without causing co-precipitation of the vanadium, iron, aluminum and phosphorus, comprising:
   (1) maintaining the temperature of said solution below 60° C.,
   (2) maintaining the pH of said solution at about 0.0 ±0.1.
   (3) adding to said solution
      (a) copper ions, and thereafter
      (b) sufficient sulfide ions to cause substantially complete precipitation of the arsenic as $As_2S_3$ and substantial precipitation of the copper as copper sulfide,
   (4) digesting said solution at a temperature of from below 60° C. to about 25° C., and
   (5) separating the precipitated copper and arsenic compounds from the vanadium containing solution.

6. The process of claim 5 wherein the copper ions are provided by the addition of copper sulfate.

7. The process of claim 6 wherein sufficient copper ions are provided to achieve a concentration of about 5.0 grams per liter of hydrated copper sulfate.

8. The process of claim 5 wherein the sulfide ions are provided by the addition of $H_2S$.

9. The process of claim 5 wherein the sulfide ions are provided by the addition of NaSH.

10. The process of claim 5 wherein the solution is agitated during digestion.

References Cited by the Examiner
UNITED STATES PATENTS 1,515,245  11/24  Erickson _____ 23—19.1
1,651,967  12/27  Reed _____ 23—19.1

OTHER REFERENCES

Curtman: "Introduction to Semimicro Qualitaive Chemical Analysis," Rev. ed., The MacMillan Co., N.Y., 1950, pp. 139, 142, and 145.

MAURICE A. BRINDISI, *Primary Examiner.*

UNITED STATES PATENT OFFICE
CERTIFICATE OF CORRECTION

Patent No. 3,216,787                          November 9, 1965

William Koenen et al.

It is certified that error appears in the above identified patent and that said Letters Patent are hereby corrected as shown below:

Column 2, line 5, after "sufficient" insert -- sulfide --. Column 4, line 19, "manifold" should read -- many fold --; line 40, "+0.1" should read -- ±0.1 --.

Signed and sealed this 23rd day of December 1969.

(SEAL)
Attest:

Edward M. Fletcher, Jr.                        WILLIAM E. SCHUYLER, JR.
Attesting Officer                                  Commissioner of Patents